(12) United States Patent
Qian et al.

(10) Patent No.: US 7,944,889 B2
(45) Date of Patent: May 17, 2011

(54) SYSTEM AND METHOD FOR RATE SHIFTING FOR WIRELESS VOIP

(75) Inventors: Lu Qian, Solon, OH (US); Sandeep Shetty, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 933 days.

(21) Appl. No.: 11/351,369

(22) Filed: Feb. 10, 2006

(65) Prior Publication Data

US 2007/0189225 A1   Aug. 16, 2007

(51) Int. Cl.
*H04B 7/212* (2006.01)
(52) U.S. Cl. .............. 370/332; 455/135; 455/163.3
(58) Field of Classification Search .......... 370/332, 370/329
See application file for complete search history.

(56) References Cited

U.S. PATENT DOCUMENTS

| | | | |
|---|---|---|---|
| 6,791,959 B1* | 9/2004 | Palmer et al. | 370/332 |
| 2004/0165575 A1* | 8/2004 | Yang et al. | 370/349 |
| 2005/0086569 A1* | 4/2005 | Hiddink et al. | 714/749 |
| 2005/0195744 A1 | 9/2005 | Ryan et al. | |
| 2005/0249157 A1 | 11/2005 | Qian et al. | |
| 2006/0172711 A1* | 8/2006 | King et al. | 455/101 |
| 2006/0222118 A1* | 10/2006 | Murthy et al. | 375/345 |

OTHER PUBLICATIONS

PCT International Search Report, International Application No. PCT/US07/61741, Dec. 17, 2007.

* cited by examiner

*Primary Examiner* — Rafael Pérez-Gutiérrez
*Assistant Examiner* — Marcos Batista
(74) *Attorney, Agent, or Firm* — Tucker Ellis & West LLP

(57) ABSTRACT

A method of rate shifting specially suited for the voice traffic, which differentiates poor channel conditions from a heavily loaded channel of a WLAN and adapts to the network traffic condition and channel condition promptly with low rate of false shifting. Determining when to rate shift is based on a combination of the received signal strength indication and the retry rate.

22 Claims, 4 Drawing Sheets

| Rate (Mbps) | RSSI (dBm) PER (10%) | RSSI (dBm) PER (3%) | RSSI_low (dBm) | RSSI_High (dBm) |
|---|---|---|---|---|
| 6 | -82 | -77 | -infinite | -77 |
| 12 | -79 | -73 | -79 | -73 |
| 24 | -76 | -70 | -76 | infinite |

Figure 5

SYSTEM AND METHOD FOR RATE SHIFTING FOR WIRELESS VOIP

BACKGROUND OF THE INVENTION

The present invention relates generally to a system and method for implementing rate shifting for wireless communications and more particularly to a system and method for implementing rate shifting for Wireless Voice Over Internet Protocol (VoIP).

Rate shifting has a significant impact on the performance of a Wireless Local Area Network (WLAN). Its goal is to reduce packet error rate by selecting an optimal data rate. It is often an effective means to respond to the change of channel conditions. However, shifting too conservatively or too slowly can reduce the network throughput, while shifting too aggressively can also cause excess packet errors and result in degradation in network performance. So designing an effective rate shifting algorithm is very challenging. This is especially true for Wireless Voice over IP (WVoIP) as the strict QoS (Quality of Service) requirement for voice traffic can not sustain a slow rate adaptation or a false rate shifting.

Rate shifting is beyond the scope of IEEE 802.11 standards. Many implementations of rate shifting algorithm are available and each has its preferred use scenarios. Commonly used rate shifting algorithms often trigger rate shifting when the number of retries hit some pre-determined retry limit. However, there are two causes for packet errors: poor channel conditions and the overload of a network. In the first case, the retry based rate shifting works quite well, but it fares badly for the second case since a down-shifting in a congested network will increase network congestion. Thus, there is a need for innovative rate shifting algorithms that can differentiate between causes of packet errors and can rate shift accordingly.

BRIEF SUMMARY OF THE INVENTION

In accordance with an aspect of the present invention, there is disclosed herein a method of rate shifting specially suited for the voice traffic, which differentiates poor channel conditions from heavy load of a WLAN and adapts to the network traffic condition and channel condition promptly with low rate of false shifting.

In accordance with an aspect of the present invention, there is disclosed herein a method for rate shifting. The method comprising operating at an original rate, acquiring data representative of a current retry rate, acquiring data representative of a current received signal strength indication, and determining whether to rate shift to a second rate based on the combination of the current retry rate and the current received signal strength indication.

In accordance with an aspect of the present invention, there is disclosed herein an apparatus comprising circuitry for processing wireless signals and rate shifting logic coupled to the circuitry for processing wireless signals and operative to control the circuitry for processing wireless signals. The circuitry for processing signals operates at an original rate. The rate shifting logic is operable to acquiring data representative of a current retry rate from the circuitry for processing wireless signals and is operable to acquiring data representative of a current received signal indication from the circuitry for processing wireless signals. The rate shifting logic is responsive to determine whether to change to a second rate based on the current retry rate and the current received signal strength indication. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software.

In accordance with an aspect of the present invention, there is disclosed herein an apparatus comprising means for processing wireless signals that is operating at an original rate, means for acquiring data representative of a current retry rate, means for acquiring data representative of a current received signal strength indication, and means for controlling operable to control a rate of operation for the means for processing wireless signals. The means for controlling is responsive to receiving data from the means for acquiring data representative of a current retry rate and the means for acquiring data representative of a current received signal strength indication to determine whether to rate shift to a second rate based on the combination of the current retry rate and the current received signal strength indication.

A benefit of the present invention is that it differentiates between the two causes of packet errors, so it outperforms conventional rate shifting algorithms especially in a heavily loaded network environment. Furthermore, the present invention adapts to the real time network channel conditions very promptly which is especially good for wireless voice over IP applications. Including a transition period provides a low rate of false shifting.

Still other objects of the present invention will become readily apparent to those skilled in this art from the following description wherein there is shown and described a preferred embodiment of this invention, simply by way of illustration of at least one of the best modes best suited to carry out the invention. As it will be realized, the invention is capable of other different embodiments and its several details are capable of modifications in various obvious aspects all without departing from the invention. Accordingly, the drawing and descriptions will be regarded as illustrative in nature and not as restrictive.

BRIEF DESCRIPTION OF THE SEVERAL VIEWS OF THE DRAWING

The accompanying drawings incorporated in and forming a part of the specification, illustrates several aspects of the present invention, and together with the description serve to explain the principles of the invention.

FIG. 5 is a table of exemplary RSSI_low and RSSI_high settings.

DETAILED DESCRIPTION OF INVENTION

Figure 1:
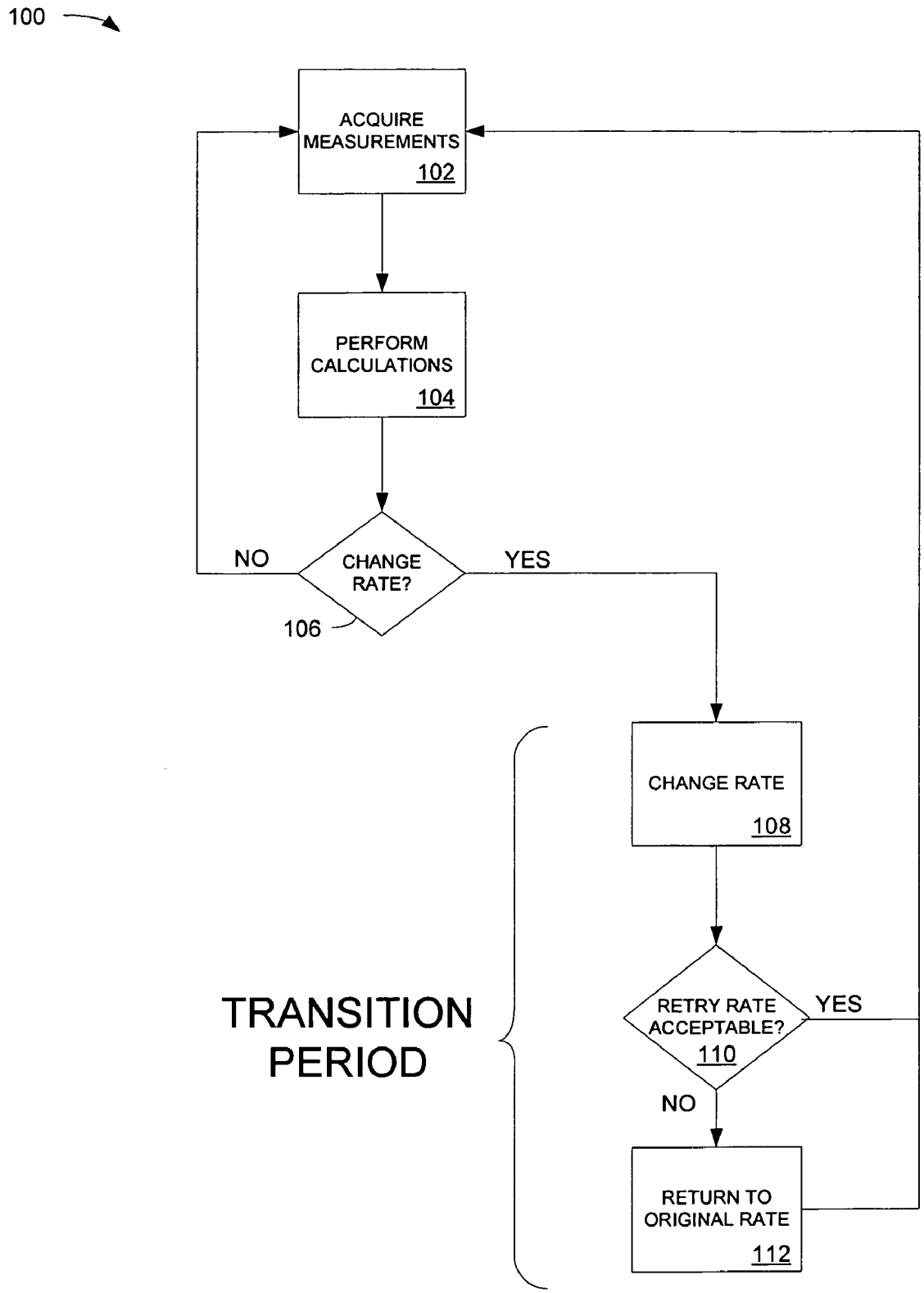
FIG. 1 is a block diagram of a methodology for a wireless device to determine whether to shift from an original rate to a second rate.

Throughout this description, the preferred embodiment and examples shown should be considered as exemplars, rather than limitations, of the present invention. An aspect of the present invention is a rate shifting algorithm specially suited for WVoIP (Wireless Voice over Internet Protocol 'IP'), which adapts to real time network conditions very promptly. Rate shifting is driven by both retry rate and received signal strength. An aspect of the present invention is it differentiates the two main causes of packet errors: poor channel conditions and heavy network load.

In a preferred embodiment, false shifting is reduced with a transition period of rate shifting. This rate shifting method covers both down-shifting and up-shifting. Moreover, the data rates for voice packets are often chosen from a subset of all available data rates to simplify the implementation without adversely affecting the performance.

In a preferred embodiment, the rate shifting method includes a set of down shifting and up shifting triggers and a transition period for rate shifting. The shifting triggers involve the comparisons between a number of measured quantities and a number of pre-determined thresholds for various data rates, whose values are optimally selected via simulations, as will described herein. These thresholds include:

RSSi_low (threshold of RSSi for down shifting);
RSSi_high (threshold of RSSi for up shifting);
minRetryRate (lower bound of retry rate);
maxRetryRate (upper bound of retry rate);
r_d (a fraction used for down-shifting in the transition state); and
r_u (a fraction used for up-shifting in the transition state).
The measured quantities are RR (the retry rate) and RSSI (the received signal strength). In a preferred embodiment both RR and RSSI are smoothed with a moving average over time windows.

Down shifting is triggered when RSSI is too low given that retry rate is not very low, or mathematically expressed as:
(RSSI<RSSi_low AND RR>minRetryRate), or
(RR>maxRetryRate).

Up shifting is triggered when RSSI is high or RR low when RSSI is high enough. Or equivalently,
(RSSI>RSSi_high) or
(RR<minRetryRate AND RSSI>RSSi_low).

In a preferred embodiment, there is a transition state for rate shifting for reducing false shifting. If a rate shifting is triggered, the new rate goes to a transition state for a short period. The new rate is kept at the end of transition period if it has an acceptable packet error rate. For example, a predetermined criteria can be established and the packet error rate is acceptable when:
RR<r_d*RR_rec (for down shifting); or
RR<r_u*RR_rec (for up shifting);
wherein RR_rec is the recorded retry rate right before the shifting.

The above algorithm has been simulated for 802.11a, b, g, for many complex scenarios. For example, the rapid change in channel conditions are simulated with clients moving towards the AP or away from the AP at various speeds with both slow and fast fading are presented. The simulations have shown that the rate shifting algorithm promptly adapts to the channel conditions and network load conditions. It differentiates well the poor channel condition from the heavy load condition so that it does not down shift when packet errors are caused by heavy load. An aspect of the present invention is that it can support multiple rates and multiple thresholds.

Figure 2:
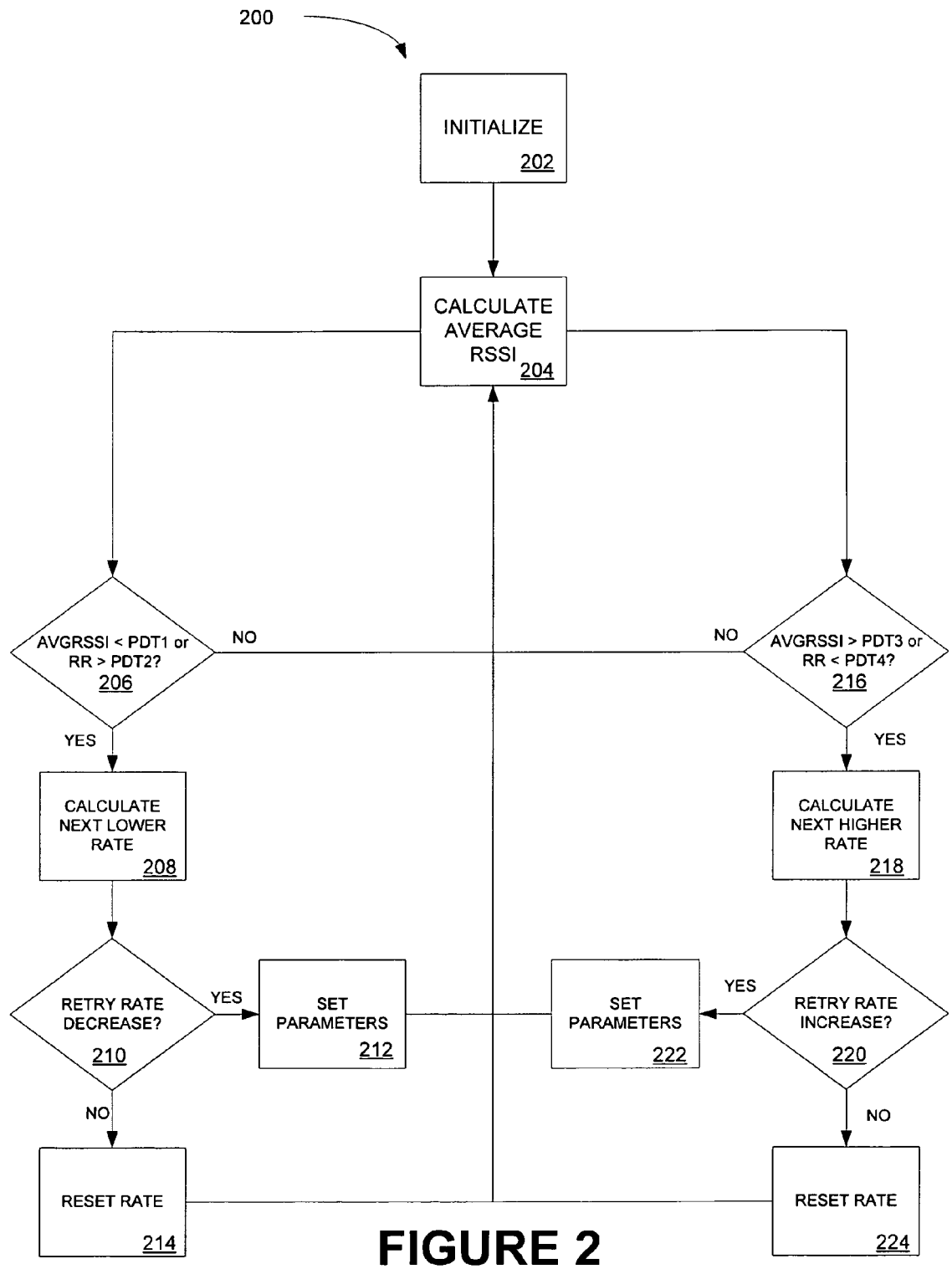
FIG. 2 is a block diagram of a methodology for a wireless device to dynamically calculate retry rate and RSSI thresholds.

In view of the foregoing functional features described above, methodologies in accordance with various aspects of the present invention will be better appreciated with reference to FIGS. 1 and 2. While for purposes of simplicity of explanation the methodologies of FIGS. 1 and 2 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. Embodiments of the present invention are suitably adapted to implement the methodology in logic such as hardware, software, or a combination thereof.

FIG. 1 is a block diagram of a methodology 100 suitable for a wireless device operating at an original rate to determine whether to shift from the original rate to a second rate. At 102, measurements are acquired. The measurements can include data representative of a current retry rate and data representative of a current received signal strength indication.

At 104, calculations are performed based on the acquired data. In a preferred embodiment, a current average of the RSSI and a current average of the retry rate are computed. For example, the current average of the RSSI can be computed as the sum of $15/16$ times the previous average RSSI and $1/16$ times the most recent measured RSSI. A current average retry can be computed as the sum of $15/16$ times the previous average retry rate and $1/16$ times the most recent measured retry rate. Optionally, as will be described in further detail herein infra (see FIG. 2), one or more of the group consisting of calculating a minimum retry threshold, a maximum retry threshold, a low received signal strength indication threshold and high received signal strength indication threshold based on the average received signal strength threshold is dynamically adjusted based on one or more of the group consisting of the average retry rate and the average RSSI.

At 106, it is determined whether the rate should be changed. In a preferred embodiment the determination of whether to rate shift to a second rate is based on the combination of the current retry rate (or the current average retry rate) and the current received signal strength indication (or the current average RSSI). If at 106 it is determined not to change the rate (NO) then processing returns to 102 where the channel is continued to be monitored by again acquiring data.

If at 106 it is determined to change the rate (YES), then the rate is changed to a second rate as shown at 108. The second rate is lower than the original rate responsive to determining at 106 that the current received signal strength indication (or current average RSSI) is lower than a first predetermined level (e.g. RSSi_low) and the retry rate (or current average retry rate) is higher than a second predetermined level (e.g. minRetryRate). Alternatively, the second rate is lower than the original rate responsive to determining that the retry rate (or current average retry rate) is greater than a maximum retry rate even when RSSi_low is undetermined. The second rate is higher than the original rate responsive to the RSSI being high (e.g. RSSI>RSSi_high) or the retry rate is low (e.g. RR<minRetryRate) when the RSSI is high enough (e.g. RSSI>RSSi_high).

In a preferred embodiment, there is a transition period comprising changing rate (at 106), determining whether the retry rate is acceptable (at 108), and if a 108 the retry rate is not acceptable returning to the original rate as shown at 112.

At 110, data is acquired representative of an error rate at the second rate and it is determined whether the retry rate at the second rate is acceptable. For example, if the second rate is lower than the first rate and error rate at the second rate is less than r_d*RR_rec (where r_d is a predetermined criteria such as 25% and RR_rec is the Retry Rate at the original rate)

(YES), then the new rate is kept and processing returns to 102. Otherwise (NO), at 112 the original rate is reinstated and processing returns to 102.

As another example, if the second rate is higher than the first rate and error rate at the second rate is less than r_u*RR_rec (where r_u is a predetermined criteria, such as 25%, and RR_rec is the recorded Retry Rate at the original rate just before shifting) (YES), then the new rate is kept and processing returns to 102. Otherwise (NO), at 112 the original rate is reinstated and processing returns to 102.

An aspect of the present invention provides for dynamic threshold adjustment, enabling thresholds to be adaptive (change over time). Thresholds can be maintained on a per client basis (or any other criteria such as per channel). In a preferred embodiment, dynamic threshold adjustment can be performed by maintaining a moving average of the RSSI (received signal strength intensity). A set of high and low RSSI thresholds are maintained for each data rate. These RSSI thresholds are learned/estimated/stored when a successful rate change occurs. Initially the retry rate is the only criteria for rate shifting until the RSSI thresholds are learned for the current data rate. Once a thresholds is learned for a given date rate, the RSSI thresholds are used in conjunction with the retry rate to make future shifting decisions.

Referring now to FIG. 2, there is illustrated a block diagram of a methodology 200 for a wireless device to dynamically calculate retry rate and RSSI thresholds. At 202 rate shifting parameters are initialized. An example of initialized parameter is:

rate (bit rate) is based on measured received RSSI (Rx RSSI) of packets;

minRetry (Min Retry Threshold, or MinRetryRate) set to a default setting;

maxRetry (Max Retry Threshold, or MaxRetryRate) set to a default setting;

deltaLow (Low RSSI Threshold, or RSSi_low) set to a default setting;

deltaHigh (High RSSI Threshold, or RSSi_high) is based on bit rate; and startRSSi set to measure received RSSI (Rx RSSI).
See FIG. 5 for example settings.

At 204, the average RSSI (avgRSSi) and packet retry rate (retryRate) are calculated.

At 206, the average RSSI and packet retry rate are compared with first and second predetermined factors (PDT1 and PDT2) respectively. A decision is then made based on the calculations whether to dynamically adjust the parameters. For example, if avgRSSI<startRSSi−deltaLow or retryRate>MaxRetry (YES), then at 208 a retry rate (retryRate) is calculated for the next lower rate. At 210 it is determined whether the retry rate decreased sufficiently. For example, if retryRate 25% lower at the lower rate (YES) then at 212 set startRSSi, deltaLow, deltaHigh, minRetry and maxRetry; otherwise (NO) reset the rate at 214. At 204 the next average RSSI is calculated and 206 (and if necessary 208, 210, 212, 214) repeat.

If at 206 avgRSSI>startRSSi+deltaHigh or retryRate<MaxRetry (NO), the next average RSSI is calculated at 204.

At 216, the average RSSI and packet retry rate are compared with third and fourth predetermined factors (PDT3 and PDT4) respectively. A decision is then made based on the calculations whether to dynamically adjust the parameters. For example, if avgRSSI>startRSSi+deltaHigh or retryRate<MinRetry (YES), then at 218 a retry rate (retryRate) is calculated for the next higher rate. At 220 it is determined whether the retry rate changes sufficiently. For example, if retryRate is not more than 25% higher at the higher rate (YES) then at 222 set startRSSi, deltaLow, deltaHigh, minRetry and maxRetry; otherwise (NO) reset the rate at 224. At 24 the next average RSSI is calculated and 216 (and if necessary 218, 220, 222, 224) repeat.

If at 216 avgRSSI<startRSSi+delta_high or retryRate>MinRetry (NO), the next average RSSI is calculated at 204.

Figure 3:
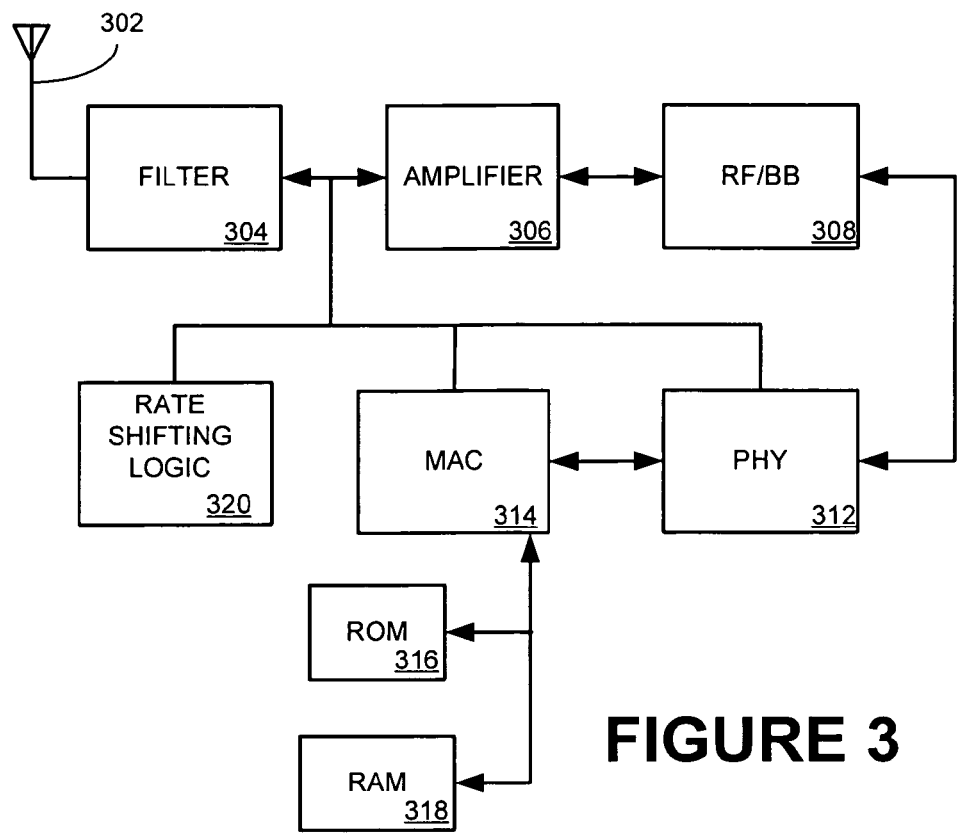
FIG. 3 is a block diagram of a wireless transceiver upon which an aspect of the present invention is implemented.

Referring to FIG. 3, there is illustrated a block diagram of a wireless transceiver 300 suitable for implementing an aspect of the present invention. Wireless transceiver 300 comprises an antenna 302 for sending and receiving wireless signals. Filter 304 filters signals to/from antenna 302. Preferably, filter 304 is a bandpass filter. Amplifier 306, which can be a low noise amplifier, amplifies signals to/from filter 304. Wireless frequency (e.g. Radio Frequency) to Baseband (RF/BB) converter 308 converts RF signals to/from amplifier 306 and PHY 312. RF/BB converter 308 may suitably comprise additional Intermediate Frequency Stages (e.g., RF/IF and IF/BB). Physical Layer processor (PHY) 312 is coupled to D/A A/D 310. Media Access Controller (MAC) 314 is coupled to PHY 312. Read Only Memory (ROM) 316 and Random Access Memory (RAM) 318 are associated with MAC 314. Transceiver 3 may further comprise additional filters (not shown) e.g. bandpass and/or baseband filters and amplifiers (Not shown), e.g. a Low Noise Amplifier (LNA) or Power Amplifier (PA) as desired; however, these additional filters are not necessary for understanding aspects of the present invention.

PHY 312 is a physical layer (PHY) processing device (e.g., a modem or digital signal processor). PHY 312 typically performs digital signal processing, such as analog-to-digital and digital-to-analog conversion, and encoding/decoding of waveforms (modulation/demodulation). The digital signal processing can be done with general purpose digital signal processing integrated circuits, or in specially designed digital logic. In either case, PHY 312 is modulating/demodulating data to be compatible with the appropriate communication standard. For example, in IEEE 802.11a this involves OFDM, while in IEEE 802.11b it involves Direct Sequence Spread Spectrum (DSSS). On one side of PHY 312, data is exchanged with MAC 314, while on the other side of PHY 312, it is exchanged with RF/BB 308. PHY 312 typically includes analog-to-digital (A/D) converters for data received from RF/BB 308, and digital-to-analog (D/A) converters for data transmitted to RF/BB 308.

MAC 314 is a Medium Access Control (MAC) processing system, In a preferred and/or alternative embodiment the MAC processing system includes a MAC processor (e.g., an embedded processor) which is a multi-functional processor engine responsible for a variety of different processing tasks associated with the wireless communications. RAM 318 is used by MAC 314 to store data going to and from PHY 312. MAC 314 can act upon the data, for example, by encrypting or decrypting it, or by interpreting the data and making decisions as to how and when to forward it.

In operation, signals received by antenna 302 are filtered by filter 304. Amplifier 306 amplifies the signal and RF/BB converter 308 converts the frequency from its wireless (e.g. RF) frequency to a baseband (or other suitable) frequency. The baseband signal is then processed by PHY 312 which may perform one or more of converting the signal from analog to digital, demodulating and decoding. The signal processed by PHY 312 is forwarded to MAC 314 for further processing.

A signal to be transmitted by wireless transceiver 3 is processed by MAC 314. For example MAC 314 may encrypt the signal. The signal may be stored at RAM 318 for future transmission or immediately forwarded to PHY 312. PHY 312 then performs one or more of encoding, modulating, and converting from digital to analog. The signal from PHY 312 is then sent to RF/BB converter 308 which converts the signal to the appropriate wireless frequency. Amplifier 306 amplifies the signal, which is then passed through filter 304 and to antenna 302 for transmission.

Rate shifting logic 300, comprises logic configured for controlling the operation of wireless transceiver 300 such as by performing the functionality of the various methodologies (e.g. methodology 100 or methodology 200) described herein. Rate shifting logic 300 is adapted to acquire measurements for implementing the methodologies described herein. For example, rate shifting logic can acquire data from the output of filter 304, from PHY 312 or from MAC 314.

For example, wireless transceiver 300 can be configured to operate at an original rate. Rate shifting logic 320 is operable to acquiring data representative of a current retry rate from the circuitry for processing wireless signals (e.g. from antenna 302, output of filter 304, PHY 312, MAC 314 or any suitable location). Rate shifting logic 320 is also operable to acquiring data representative of a current received signal indication from the circuitry for processing wireless signals. Rate shifting logic 320 is responsive to determine whether to change to a second rate based on the current retry rate and the current received signal strength indication.

In a preferred embodiment, rate shifting logic 320 can be configured to shift wireless transceiver 300 to a lower rate responsive to the determining RSSI<RSSi_Low or RR>minRetryRate. Rate shifting logic 320 can further be configured to shift wireless transceiver to a higher rate responsive to RSSI>RSSi_high or RR<minRetryRate and RSSI>RSSI_low.

In a preferred embodiment, after shifting to a new rate, rate shifting logic 300 acquires data representative of an error rate at the second rate to determine whether the error rate at the new rate is acceptable. If rate shifting logic 300 determines the error rate is acceptable, wireless transceiver 300 continues operating at the (new) second rate; otherwise rate shifting logic 300 returns wireless transceiver 300 to its original operating rate. Using a transition period tends to reduce false shifting. For example, the new rate is maintained if RR<r_d*RR (for down shifting) or RR<r_u*RR_Rec (for up shifting).

In a preferred embodiment, rate shifting logic 300 uses current averages for RSSI and/or retry rate to determine whether to shift to a new rate. Using a moving average over time cuts down on thrashing and increases stability. As an example of computing a moving average, New Moving Average=$15/16$*Old Moving Average+$1/16$*current measurement (e.g. retry rate/RSSI).

Figure 4:
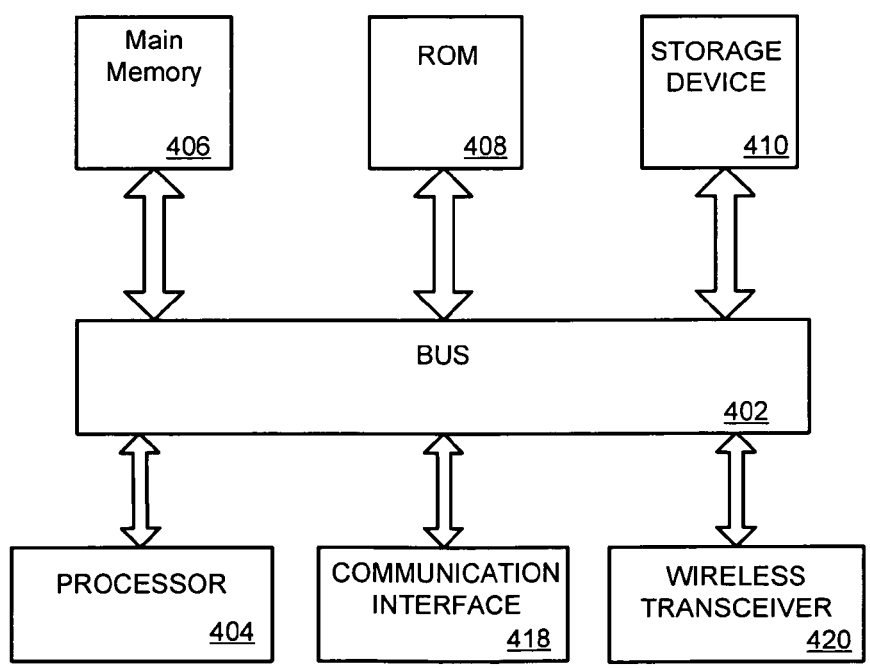
FIG. 4 is a block diagram of a computer system upon which an aspect of the present invention is implemented.

FIG. 4 is a block diagram that illustrates a computer system 400 upon which an embodiment of the invention may be implemented. For example computer system 400 can be used to implement the functionality of rate shifting logic 320 (FIG. 3) or to perform methodology 100 (FIG. 1) or methodology 200 (FIG. 2).

Computer system 400 includes a bus 402 or other communication mechanism for communicating information and a processor 404 coupled with bus 402 for processing information. Computer system 400 also includes a main memory 406, such as random access memory (RAM) or other dynamic storage device coupled to bus 402 for storing information and instructions to be executed by processor 404. Main memory 406 also may be used for storing a temporary variable or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

The invention is related to the use of computer system 400 for implementing rate shifting. According to one embodiment of the invention, implementing rate shifting is provided by computer system 400 in response to processor 404 executing one or more sequences of one or more instructions contained in main memory 406. Such instructions may be read into main memory 406 from another computer-readable medium, such as storage device 410. Execution of the sequence of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to non-volatile media, volatile media, and transmission media. Non-volatile media include for example optical or magnetic disks, such as storage device 410. Volatile media include dynamic memory such as main memory 406. Transmission media include coaxial cables, copper wire and fiber optics, including the wires that comprise bus 402. Transmission media can also take the form of acoustic or light waves such as those generated during radio frequency (RF) and infrared (IR) data communications. Common forms of computer-readable media include for example floppy disk, a flexible disk, hard disk, magnetic cards, paper tape, any other physical medium with patterns of holes, a RAM, a PROM, an EPROM, a FLASHPROM, any other memory chip or cartridge, a carrier wave as described hereinafter, or any other medium from which a computer can read.

Various forms of computer-readable media may be involved in carrying one or more sequences of one or more instructions to processor 404 for execution. For example, the instructions may initially be borne on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406 from which processor 404 retrieves and executes the instructions. The instructions received by main memory 406 may optionally be stored on storage device 410 either before or after execution by processor 404.

Optionally, when computer system 400 is employed for devices coupled to a distribution network (or other local area network or LAN), such as an Access Point (AP), computer system 400 also includes a communication interface 418 coupled to bus 402. Communication interface 418 provides a two-way data communication to the LAN. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

Wireless transceiver is operatively coupled to bus 402 to enable processor 404 to implement control functions and/or acquire data. For example, to acquire data for performing calculations described herein, processor 404 can acquire the data from wireless transceiver 420 via bus 420. In some embodiments, processor 404 directly requests the data from wireless transceiver 420, in other embodiments, wireless transceiver can store the data in main memory 406 via bus 402.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims interpreted in accordance with the breadth to which they are fairly, legally and equitably entitled.

The invention claimed is:

1. A method of rate shifting a data rate for a wireless transceiver, comprising:
    operating the network at an original rate;
    acquiring data representative of a current retry rate as a measure of network load of the network operating at the original rate;
    acquiring data representative of a current received signal strength indication as a measure of a network channel condition of the network operating at the original rate;
    determining whether performance of the network channel has degraded based on the data representative of the current retry rate;
    responsive to determining that the performance of the network channel has degraded based on the data representative of the current retry rate, selectively determining whether signal quality of the network channel has degraded based on the data representative of the current received signal strength indication;
    shifting, during a predetermined transition period, the operating of the network from the original rate to a second rate responsive to: i) determining the performance of the network channel has degraded and ii) determining the signal quality of the network channel has degraded; and
    maintaining, during the predetermined transition period, the operating of the network at the second rate.

2. A method for rate shifting according to claim 1, wherein the shifting includes shifting to a second rate lower than the original rate responsive to determining one of group consisting of a combination of current received signal strength indication is lower than a first predetermined level and the current retry rate is greater than a second predetermined level, and the current retry rate is greater than a third predetermined level.

3. A method for rate shifting according to claim 1, wherein the shifting includes shifting to a second rate higher than the original rate responsive to determining one of group consisting of a combination of current received signal strength indication is higher than a first predetermined level and the current retry rate is lower than a second predetermined level, and the received signal strength indication is greater than a third predetermined level.

4. A method according to claim 1, further comprising:
    acquiring data representative of an error rate at the second rate;
    comparing the data representative of an error rate at the second rate to an error rate at the first rate; and
    remaining operating the network at the second rate responsive to data representative of the error rate at the second rate is less than the error rate at the first level after the predetermined transition period.

5. A method according to claim 1, further comprising:
    acquiring data representative of an error rate at the second rate;
    comparing the data representative of an error rate at the second rate to an error rate at the first rate; and
    shifting operating the network to the original rate responsive to the data representative of an error rate at the second rate is greater than the error rate at the first level after the predetermined transition period.

6. A method according to claim 1, further comprising:
    calculating a current average retry rate based on data representative of a past retry rate and the current retry rate;
    wherein the average retry rate is used for determining whether to rate shift to a second rate.

7. A method according to claim 1, further comprising:
    calculating a current average received signal strength indication based on data representative of a past received signal strength indication and the current received signal strength indication;
    wherein the current average received signal strength is used for determining whether to rate shift to a second rate.

8. A method according to claim 7, further comprising:
    calculating a current average retry rate based on data representative of a past retry rate and the current retry rate;
    wherein the current average retry rate is used for determining whether to rate shift to the second rate.

9. A method according to claim 8, further comprising
    wherein the calculating a current average retry rate uses the sum of $15/16$ times the past retry rate and $1/16$ times the current retry rate; and
    wherein the calculating an average received signal strength indication uses the sum of $15/16$ times the past received signal strength indication and $1/16$ times the current received signal strength indication.

10. A method according to claim 1, further comprising:
    calculating a minimum retry threshold, a maximum retry threshold, a low received signal strength indication threshold and high received signal strength indication threshold;
    calculating a current average received signal strength threshold;
    dynamically adjusting one of group consisting of calculating a minimum retry threshold, a maximum retry threshold, a low received signal strength indication threshold and high received signal strength indication threshold based on the average received signal strength threshold.

11. A method according to claim 1, further comprising
    calculating a minimum retry threshold, a maximum retry threshold, a low received signal strength indication threshold and a high received signal strength indication threshold;
    calculating a current average retry rate;
    dynamically adjusting one of group consisting of calculating a minimum retry threshold, a maximum retry threshold, a low received signal strength indication threshold and high a received signal strength indication threshold based on the current average retry rate.

12. An apparatus configured for use in an associated network, the apparatus comprising:
  circuitry for processing wireless signals; and
  rate shifting logic coupled to the circuitry for processing wireless signals and operative to control the circuitry for processing wireless signals;
  wherein the circuitry for processing signals is operating at an original rate;
  wherein the rate shifting logic is operable to acquiring data representative of a current retry rate as a measure of network load from the circuitry for processing wireless signals;
  wherein the rate shifting logic is operable to acquiring data representative of a current received signal strength indication as a measure of a network channel condition from the circuitry for processing wireless signals;
  wherein the rate shifting logic is operable to determine whether performance of the network channel has degraded based on the data representative of the current retry rate;
  wherein the rate shifting logic is operable, responsive to determining that the performance of the network channel has degraded based on the data representative of the current retry rate, to determine whether signal quality of the network channel has degraded based on the data representative of the current received signal strength indication;
  wherein the rate shifting logic is operable, during a predetermined transition period, to shift the operating of the network from the original rate to a second rate responsive to: i) determining the performance of the network channel has degraded and ii) determining the signal quality of the network channel has degraded; and
  wherein the rate shifting logic is operable to cause the circuitry for processing wireless signals to operate at the second rate for the predetermined transition period.

13. An apparatus according to claim 12, wherein the rate shifting logic is operable to shift to a second rate lower than the original rate responsive to the rate shifting logic determining one of group consisting of a combination of current received signal strength indication is lower than a first predetermined level and the current retry rate is greater than a second predetermined level, and current retry rate is greater than a third predetermined level.

14. An apparatus according to claim 12, wherein the rate shifting logic is operable to shift to a second rate higher than the original rate responsive to the rate shifting logic determining one of group consisting of a combination of current received signal strength indication is higher than a first predetermined level and the current retry rate is lower than a second predetermined level, and the received signal strength indication is greater than a third predetermined level.

15. An apparatus according to claim 12, further comprising:
  wherein the rate shifting logic is responsive to acquiring data representative of an error rate at the second rate to determine whether the error rate is acceptable; and
  wherein the rate shifting logic is responsive to determining the error rate is acceptable to continue operating at the second rate.

16. An apparatus according to claim 12, further comprising:
  wherein the rate shifting logic is operable to calculating a current average retry rate based on data representative of a past retry rate and the current retry rate acquired from the circuitry for processing wireless signals;
  wherein the rate shifting logic is operable to calculating a current average received signal strength indication based on data representative of a past received signal strength indication and the current received signal strength indication; and
  wherein the rate shifting logic uses the current average received signal strength and the current average retry rate for determining whether to rate shift to a second rate.

17. An apparatus according to claim 12, further comprising:
  wherein the rate shifting logic is operable to calculate a minimum retry threshold, a maximum retry threshold, a low received signal strength indication threshold and high received signal strength indication threshold;
  wherein the rate shifting logic is operable to calculating a current average received signal strength threshold based on data acquired from the circuitry for processing wireless signals; and
  wherein the rate shifting logic dynamically adjusts one of group consisting of calculating a minimum retry threshold, a maximum retry threshold, a low received signal strength indication threshold and high received signal strength indication threshold based on the average received signal strength threshold.

18. An apparatus according to claim 12, further comprising
  wherein the rate shifting logic is operable to calculate a minimum retry threshold, a maximum retry threshold, a low received signal strength indication threshold and a high received signal strength indication threshold;
  wherein the rate shifting logic is operable to calculate a current average retry rate based on data acquired from the circuitry for processing wireless signals; and
  wherein the rate shifting logic dynamically adjusts one of group consisting of calculating a minimum retry threshold, a maximum retry threshold, a low received signal strength indication threshold and high a received signal strength indication threshold based on the current average retry rate.

19. An apparatus adapted for use with an associated network, the apparatus comprising:
  means for processing wireless signals of the associated network operating at an original rate; and
  means for acquiring data representative of a current retry rate as a measure of network load;
  means for acquiring data representative of a current received signal strength indication as a measure of a network channel condition;
  means for determining whether performance of the network channel has degraded based on the data representative of the current retry rate;
  means responsive to determining that the performance of the network channel has degraded based on the data representative of the current retry rate, for selectively determining whether signal quality of the network channel has degraded based on the data representative of the current received signal strength indication; and
  means for shifting, during a predetermined transition period, the operating of the associated network from the original rate to a second rate responsive to: i) determining performance of the channel has degraded and ii) determining the signal quality of the network channel has degraded; and
  means for maintaining the second rate for the predetermined transition period.

20. An apparatus according to claim 19, further comprising:
- means for acquiring data representative of an error rate at the second rate;
- means for comparing the data representative of an error rate at the second rate to an error rate at the first rate;
- means for determining whether to remain at the second rate responsive to whether the data representative of the error rate at the second rate is less than the error rate at the first rate.

21. An apparatus according to claim 19, further comprising:
- means for calculating a current average retry rate based on data representative of a past retry rate and the current retry rate;
- means for calculating a current average received signal strength indication based on data representative of a past received signal strength indication and the current received signal strength indication;
- wherein the means for controlling determines whether to shift to a second rate based on the current average retry rate and the current average received signal strength indication.

22. An apparatus according to claim 19, further comprising:
- means for calculating a minimum retry threshold, a maximum retry threshold, a low received signal strength indication threshold and high received signal strength indication threshold;
- means for calculating a current average received signal strength threshold;
- means for calculating a current average retry rate;
- means for dynamically adjusting one of group consisting of calculating a minimum retry threshold, a maximum retry threshold, a low received signal strength indication threshold and high received signal strength indication threshold based on the average received signal strength threshold responsive to one of a group consisting of the means for calculating the current average retry rate and the means for calculating the current average received signal strength indication.

* * * * *